US010935159B2

(12) United States Patent
Stadler

(10) Patent No.: US 10,935,159 B2
(45) Date of Patent: Mar. 2, 2021

(54) LOCKING SECURITY COVER FOR A VALVE BOX

(71) Applicant: David Stadler, Lathrup Village, MI (US)

(72) Inventor: David Stadler, Lathrup Village, MI (US)

( * ) Notice: Subject to any disclaimer, the term of this patent is extended or adjusted under 35 U.S.C. 154(b) by 0 days.

(21) Appl. No.: 16/688,224

(22) Filed: Nov. 19, 2019

(65) Prior Publication Data
US 2020/0116276 A1 Apr. 16, 2020

Related U.S. Application Data

(63) Continuation-in-part of application No. 15/913,241, filed on Mar. 6, 2018, now Pat. No. 10,480,679.

(60) Provisional application No. 62/467,433, filed on Mar. 6, 2017.

(51) Int. Cl.
| | |
|---|---|
| *F16K 35/06* | (2006.01) |
| *F16K 35/10* | (2006.01) |
| *E02D 29/14* | (2006.01) |
| *E03B 9/10* | (2006.01) |
| *F16K 27/12* | (2006.01) |

(52) U.S. Cl.
CPC .............. *F16K 35/06* (2013.01); *F16K 27/12* (2013.01); *F16K 35/10* (2013.01); *E02D 29/1427* (2013.01); *E03B 9/10* (2013.01); *Y10T 137/7021* (2015.04)

(58) Field of Classification Search
CPC ....... E02D 29/1427; E05C 1/004; E05C 1/02; F16K 27/12; F16K 35/06; F16K 35/10; F16L 55/136; E03B 9/10; Y10T 137/7021
See application file for complete search history.

(56) References Cited

U.S. PATENT DOCUMENTS

| | | | | | |
|---|---|---|---|---|---|
| 135,822 | A | * | 2/1873 | Laforge | E03B 9/10 137/371 |
| 1,229,429 | A | * | 6/1917 | Farley | E03B 9/10 137/371 |
| 1,408,982 | A | * | 3/1922 | Calhoun | E02D 29/1463 404/26 |
| 2,176,399 | A | ‡ | 10/1939 | Garrett | F16K 41/02 137/36 |
| 3,227,183 | A | * | 1/1966 | Hecht | F16K 35/06 138/89 |
| 4,461,597 | A | * | 7/1984 | Laurin | E02D 29/1427 137/371 |

(Continued)

*Primary Examiner* — Kevin F Murphy
*Assistant Examiner* — Jonathan J Waddy
(74) *Attorney, Agent, or Firm* — John R. Benefiel

(57) ABSTRACT

A valve box lock for preventing unauthorized access to a shut off valve including a security bolt extending through a hole in a valve box cover and received into a threaded hole in a cam piece mounted to the undersurface of the cover, the cam piece is moved up and down by rotation of the security bolt in either direction. The cam piece engages a pair of locking plates which are moved radially out into engagement with an inner surface of the valve box to prevent removal of the cover when the security bolt is rotated in one direction, or are retracted radially to release the cover so as to be able to be removed. A automatic lubricating arrangement is associated with the security bolt to insure that it is able to be turned by excluding any.

2 Claims, 14 Drawing Sheets

(56) References Cited

U.S. PATENT DOCUMENTS

| | | | | | |
|---|---|---|---|---|---|
| 4,556,081 | A | ‡ | 12/1985 | Gagas | F16K 27/0209 137/36 |
| 4,577,478 | A | * | 3/1986 | Economopoulos | B65D 90/105 70/168 |
| 4,902,165 | A | ‡ | 2/1990 | Embree | B65D 55/14 404/25 |
| 5,171,514 | A | * | 12/1992 | Veronesi | F16L 55/136 376/204 |
| 5,234,029 | A | ‡ | 8/1993 | Thomas | F16K 27/006 137/36 |
| 5,324,135 | A | * | 6/1994 | Smith | E02D 29/1427 210/164 |
| 5,403,116 | A | * | 4/1995 | Brewer | E03B 9/08 137/371 |
| 5,755,372 | A | ‡ | 5/1998 | Cimbura, Sr. | E21B 33/08 277/318 |
| 5,871,030 | A | ‡ | 2/1999 | Agbay | F16K 35/06 137/32 |
| 5,871,031 | A | ‡ | 2/1999 | Greinacher | F16K 15/207 137/32 |
| 6,009,897 | A | * | 1/2000 | Hill | E03B 9/10 137/364 |
| 7,870,867 | B2 | ‡ | 1/2011 | Agbay | F16K 35/10 137/36 |
| 9,790,714 | B1 | ‡ | 10/2017 | Stadler | F16K 35/10 |
| 10,480,679 | B2 | * | 11/2019 | Stadler | F16K 35/06 |
| 2003/0201269 | A1 | * | 10/2003 | Calder | F16L 55/11 220/328 |
| 2013/0133465 | A1 | ‡ | 5/2013 | Kreitmair-Steck | G05G 1/04 74/504 |
| 2018/0335163 | A1 | * | 11/2018 | Stadler | F16K 35/10 |

\* cited by examiner
‡ imported from a related application

FIG. 15
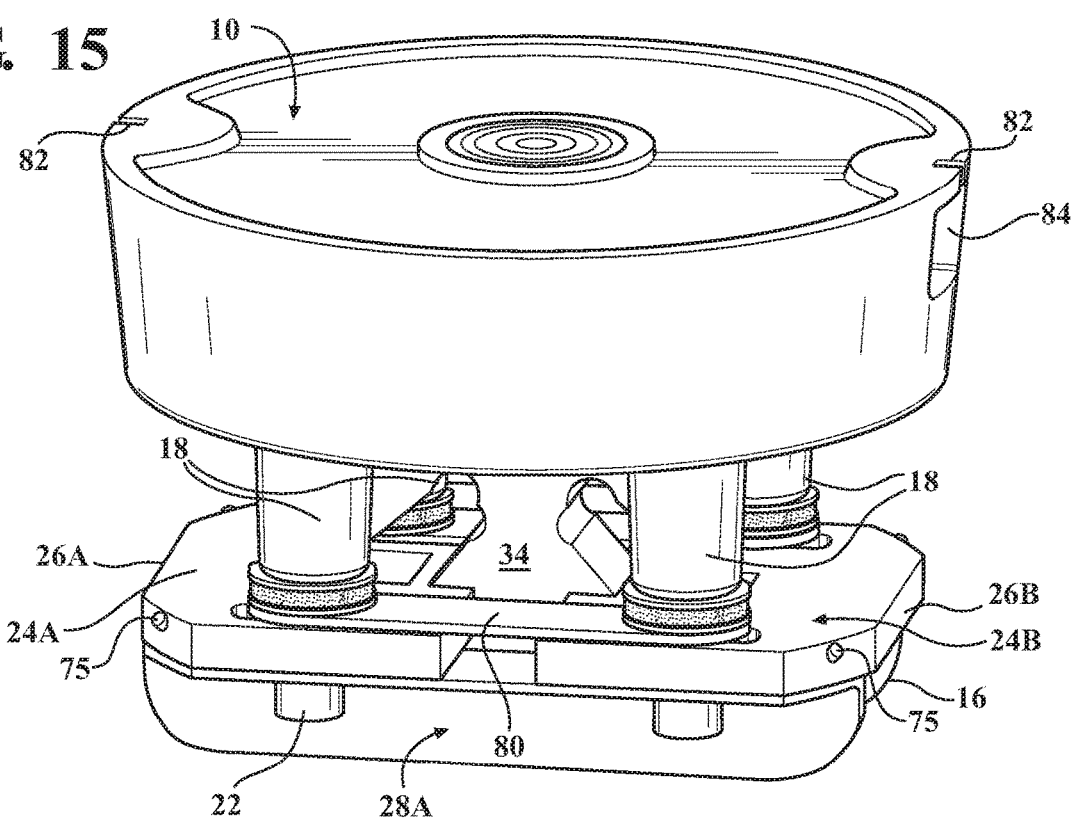
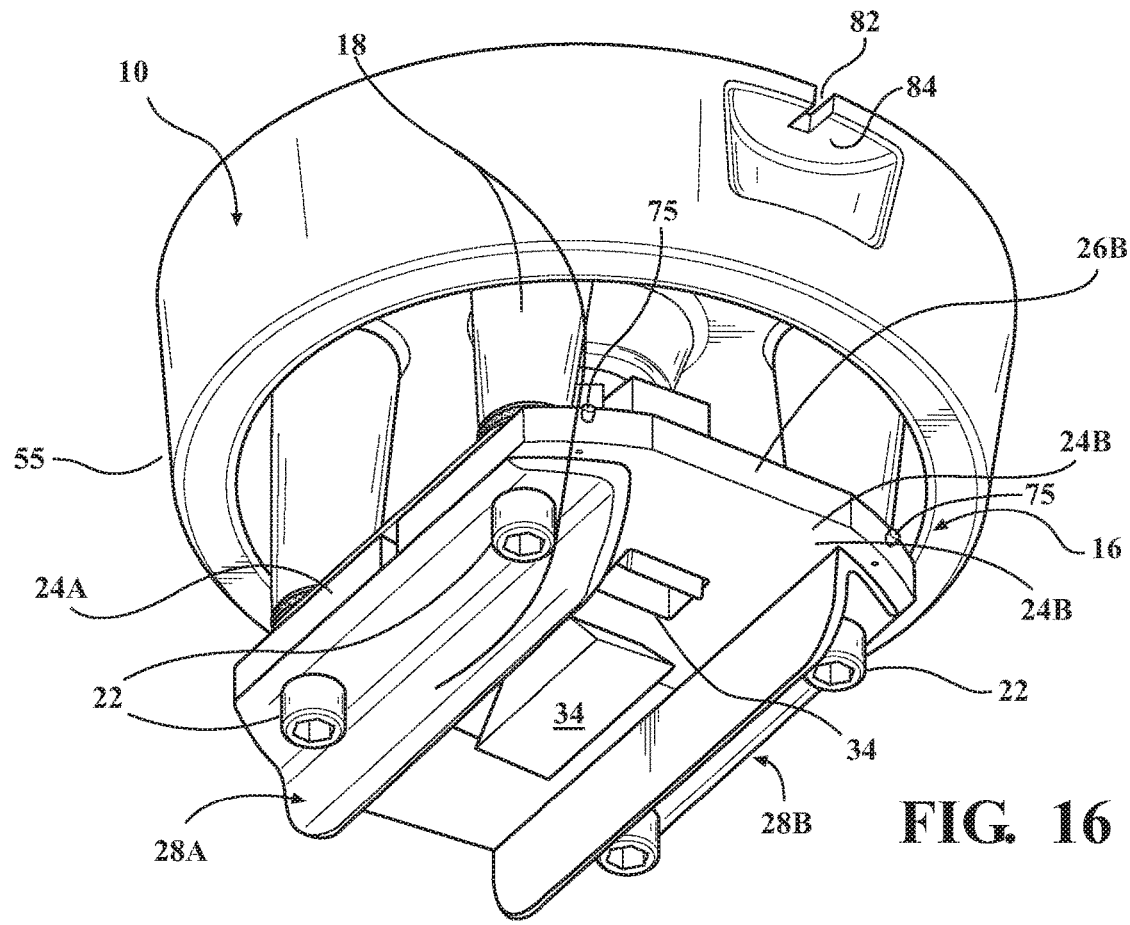
FIG. 16

LOCKING SECURITY COVER FOR A VALVE BOX

CROSS REFERENCE TO RELATED PATENT APPLICATIONS

This application is a continuation in part of U.S. Ser. No. 15/913,241 filed Mar. 6, 2018 which claims the benefit of U.S. provisional patent application Ser. No. 62/467,433 filed on Mar. 6, 2017.

BACKGROUND OF THE INVENTION

This invention concerns utility valve boxes which typically house a shut off valve which are equipped with a locking cover which prevents opening of the cover so as to prevent unauthorized access to a utility shut off valves located in the valve box.

Valve boxes typically extend down into the ground to a varying depth with a shut off valve located below the locking cover. The shut off valve is provided to enable shutting off of service so as to enable maintenance or repairs to be carried out or to terminate service to a non paying customer.

It has become a common practice for unauthorized individuals such as occupants of a residence served by the utility to open the shut off valve after it has been closed by the utility company because of nonpayment of amounts due to the utility company.

Even worse, sometimes the valve box is filled with concrete to make it much more difficult for the utility to again shut off service and which entails a substantial expense for the utility.

Conventionally, a cover is installed over the top of the valve box which is secured in place by a threaded fastener which is configured to require a special wrench to remove the same so as to prevent unauthorized operation of the shut off valve. However, such special wrenches have become easily obtainable by members of the public since used by many utilities all over the country. Thus, requiring such a special wrench to remove the cover has become a relatively ineffective means to prevent unauthorized access to the shut off valve.

In recent years, specially configured bolt heads for securing valve box covers have been devised which require a wrench unique to each particular utility company which strictly controls the sale of these wrenches so that it is much more difficult for unauthorized persons to obtain such the wrenches now needed to remove a valve box cover.

These special wrenches are described in U.S. Pat. No. 9,708,714 issued to the present inventor which is hereby incorporated by reference.

However, even without having a special wrench an unauthorized person is able to pry off a cover to thereby enable access to the shut off valve below.

Another problem with some current designs is that they rely on springs to move cover locking elements back to a released condition. In the environment of curb and valve boxes, springs can often fail due to becoming rusted out or the locking elements can become jammed by ice or dirt and the locking elements cannot be released by the springs since the springs do not exert sufficient force on the locking elements to overcome such a jammed condition.

A similar problem is presented where water, dirt, rust and breakages can potentially cause other components of a lock mechanism to be rendered inoperable so as to incur significant expense by the utility in order to be able to remove the cover and access the shut off valve.

This is particularly a problem for security bolts which can be rendered inoperable by rusting of the threads thereof after a lengthy period since the least operation of the security bolt.

The present inventor has heretofore invented a locking cover intended for use with curb boxes as described in U.S. Pat. No. 9,708,714 referenced above. Curb boxes are substantially smaller in diameter than valve boxes which also do not usually have the internal flange used in the locking cover described in the aforementioned U.S. patent. That patented design is much more resistant to efforts to pry off curb box covers than conventional designs since it features a clamping arrangement which grips the internal flange to effectively resists removal of the cover by use of a pry tool.

It is an object of the present invention to provide a locking cover which is adapted to valve boxes and which does not require that the valve box have such an internal flange extending radially inward from the outer wall of the valve box in order to lock the cover.

It has also been found that if salt water gets into the threads of the security bolt and dries out to form crystals, this will interfere with proper rotation of the security bolt.

It is a further object of the invention to provide automatic lubrication so as to prevent interference in rotation of the threads of a security bolt particularly by salt crystals forming in the threads of the security bolt.

Another approach to protecting against unauthorized access to utility shut off valves is described in U.S. Pat. No. 7,870,867, in which a curb box lock mechanism is described which is not mounted to the cover. Rather, a blocking body separate from the cover is provided which is lowered down into the valve box to a location below the cover by use of a complex and unique tool which hold the blocking body in position within the curb box. The tool can also then be used to operate a lock mechanism in the blocking body to engage locking elements with inner surfaces of the curb box so as to be held securely in position within the curb box.

This approach is intended to prevent access to the shut off valve by prying off the cover since the blocking body is not attached to the cover and will continue to block access to the shut off valve even if the cover is successfully pried loose. The blocking body itself is not able to be pried loose due to its location down in the valve box which location prevents effective use of a pry tool.

However, it is necessary to fit the fixed blocking body within the curb box by upper and lower circular collars on the lock body which remain stationary while the lock mechanism is operated. The presence of the blocking body fixed in the curb box thereby prevents access to the shut off valve which is located below the blocking body.

However, there is a tendency for the blocking body to itself become stuck in the curb box as by ice, rust, mud, accumulated debris, etc. The special tool is relied on to engage the bolt and if the claws are stuck, the special tool may not be able to be turned sufficiently to retract the bolt and disengage the claws. Worse, even if the claws are able to be retracted, jamming in the pipe of the relatively closely fit collars of the blocking body with ice, rust or debris etc, may well make it difficult or impossible to remove the blocking body from the curb box since it is located well down in the curb box.

It is therefore another object of the present invention to provide a locking mechanism for a valve box cover which reduces the incidences of jammed condition of components down in the valve box such as can be caused by the presence of rust, ice, debris, etc., to make it possible to easily overcome any such jammed condition in the unlikely event it does occur.

SUMMARY OF THE INVENTION

The above objects and other objects which will be understood by those skilled in the art are achieved by a valve box having cover lock mechanism which is mounted into the underside of the valve box cover and which includes a pair of radially extending movable locking plates which engage the inner surfaces of a valve box when advanced outwardly to very securely hold the cover in position and effectively prevent prying the cover off the top of the valve box.

Since the movable locking plates are mounted to the underside of the cover, they are supported by the cover when the locking mechanism is being operated, making possible operation of the locking mechanism from a position above the cover without removing or opening the cover. The locking mechanism components other than the locking plates themselves have a large clearance with respect to the valve box wall to making it less likely that jams caused by ice, rust, debris, etc in the clearance spaces will occur. Furthermore, the locking plates are also positively retracted by means of the cam mechanism associated with the locking plates so as to be able to effectively overcome any jam condition which may develop.

In addition, the security bolt is lubricated automatically each time the locking mechanism is operated by compression of a thick felt nut saturated by a non irritating stable lubricant such as a commercially available Teflon™ based Super Lube™ which is squeezed out and onto the threads each time the locking mechanism is operated to keep the security bolt lubricated and movable despite any long intervals occurring between each operation of the lock mechanism. In particular, the film of such lubricant thereby formed the threads has been determined to prevent sale crystals from forming in the threads.

The lock mechanism includes a cam piece which is moved up and down by a threaded security bolt extending down through an opening in the cover and threaded into a threaded bore in the cam piece. The cam piece is thereby enabled to be raised or lowered by rotation of the security bolt in either direction. The head of the bolt is configured to require a unique tool which is commercially available but is strictly limited to personnel of the particular utility, carefully controlling from reaching members of the general public. This makes it very unlikely to be able to be obtained by unauthorized persons.

The motion of the cam piece positively drives each of the locking plates in and out in a radial direction by interengaged features on the cam piece and locking plates when the security bolt is rotated in either direction. This positive drive enables very effective clearing of any restriction of movement of the locking plates which might have developed. The cover is locked by rotation of the security bolt in one direction to force the locking plates out and into engagement with the valve box inner surface.

When the security bolt is rotated in an opposite direction, the locking plates are positively retracted back into a disengaged position to release the corner and allow it to be moved off the top of the valve box.

The interengaged features on the cam piece and locking plates preferably comprise axially and radially angled slots formed in the cam piece, the slots each receiving and engaging a rectangular in cross section portion of each of the locking plates formed by a rectangular opening aligned with a notch formed in each of the locking plates. The cross section portion of each locking plate has at least two corner features.

The cam piece is moved up by rotation of the security bolt in a first direction, and a lower side of each slot in the cam piece engages an inner lower corner formed on both of the locking plate portions to positively move the locking plates radially outward away from each other as the cam piece continues to move up to move the outer end of each of the locking plates to bring the outer ends thereof into tight engagement with a valve box inner wall surface.

To release the lock, the cam piece is moved down by rotation of the security bolt in a reverse direction, and an opposite upper side of each cam piece slot then engages an upper outer corner of each of the locking plate portions, positively forcing the locking plates radially inward toward each other to release the engagement of the locking plate ends with the inner surface of the valve box.

That is, a lower side of each of the slots in the cam piece are engaged with a lower inner corner of each locking plate portion so as to cam the locking plates radially outwardly away from each other when the security bolt is rotated in a direction to cause the cam piece to be moved vertically up.

The upper side of each of the pair of slots are engaged by an outer upper corner of the locking plate portions to force the locking plates radially inward upon rotation of the security bolt in the opposite direction to disengage the outer ends of the locking plate from the valve box outer wall to thereby release the cover enabling it to be moved off the top of valve box.

Any jam condition is overcome by the large mechanical advantage generated by the interengagement of the cam piece and locking plates as described above.

DESCRIPTION OF THE DRAWING FIGURES

FIG. 15 is a perspective view of the locking cover shown in FIGS. 9 and 10 but with a different tool engagement feature formed on the locking cover.

FIG. 16 is a perspective view from the bottom of the locking cover shown in FIG. 15.

DETAILED DESCRIPTION

Figure 1:
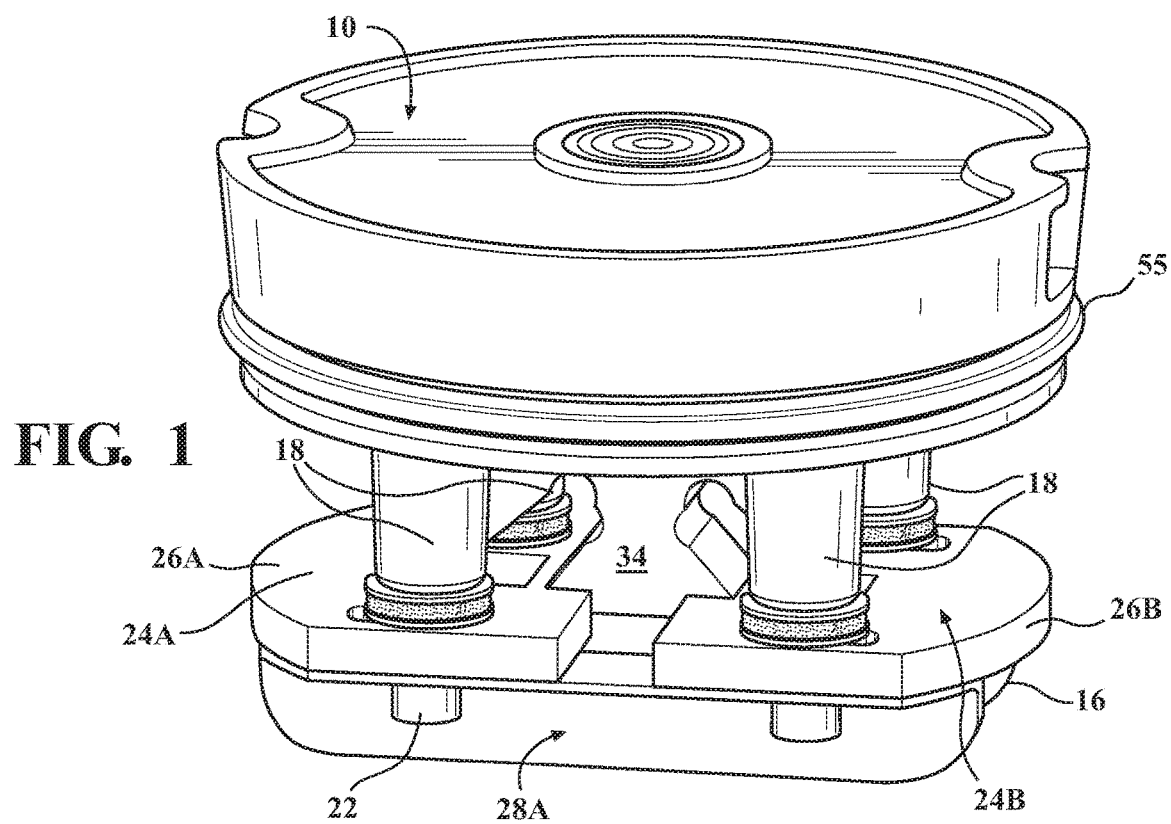
FIG. 1 is a perspective view from above of a valve box cover having an attached lock mechanism according to the present invention, shown in a cover locked condition.
Figure 2:
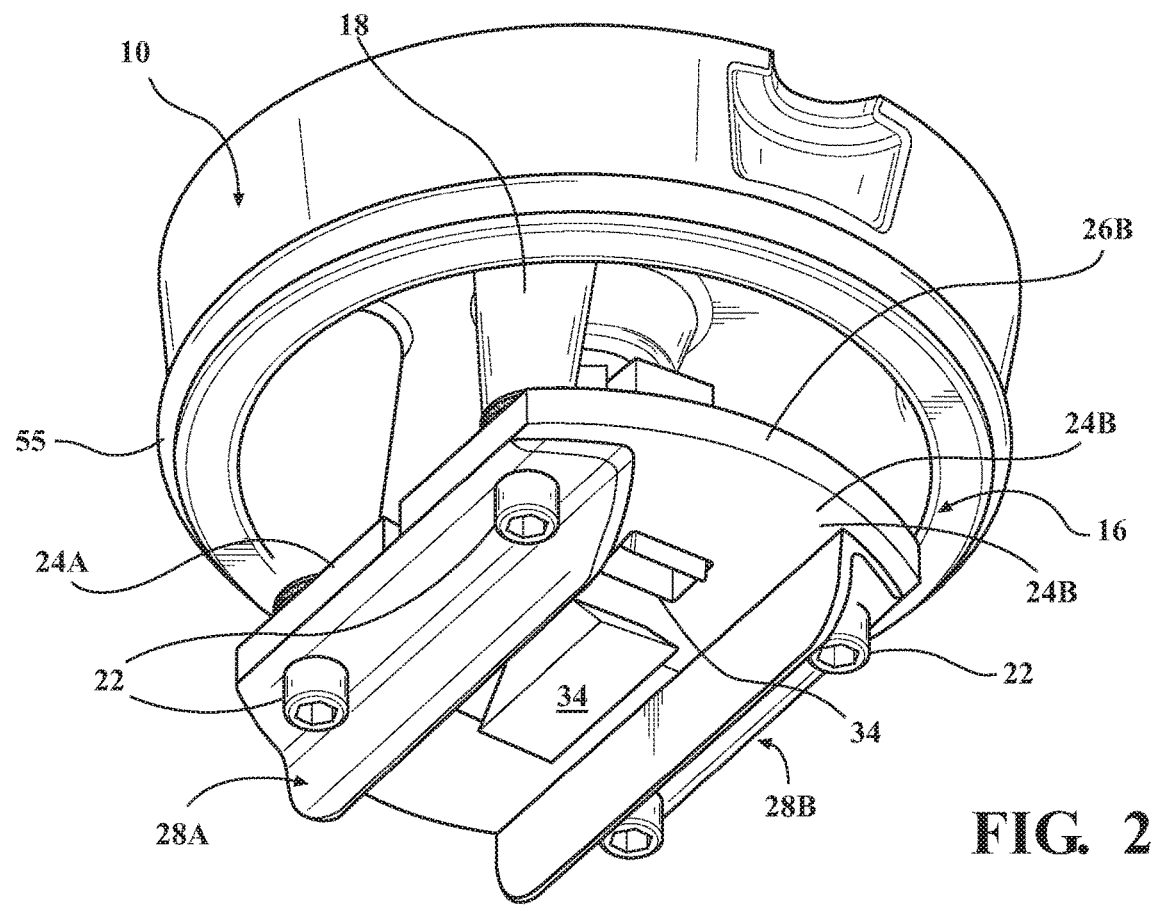
FIG. 2 is a perspective view of a valve box cover with the locking mechanism shown in a released position.
Figure 3:
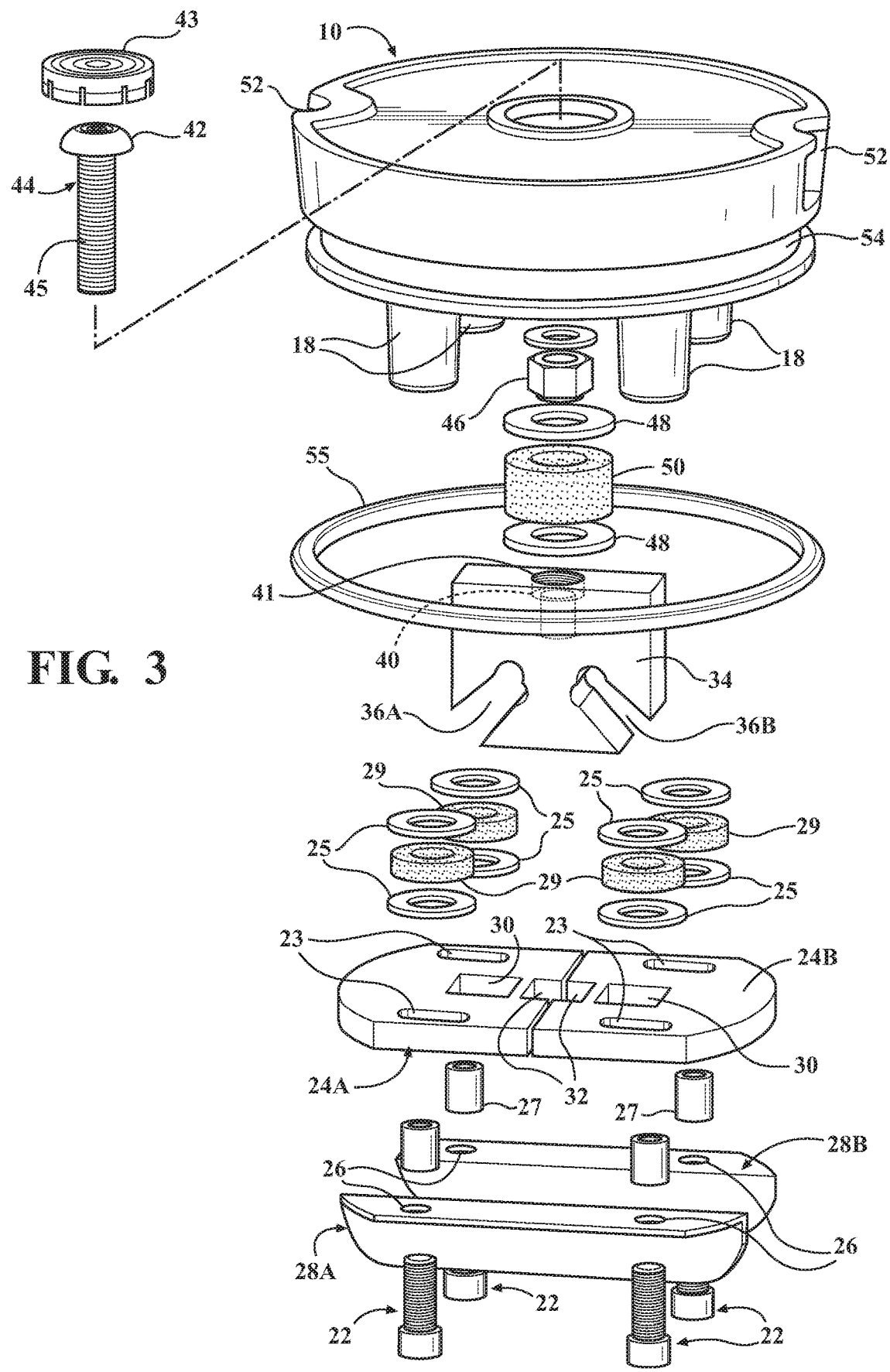
FIG. 3 is an exploded perspective view of a valve box cover and lock mechanism components shown in FIGS. 1 and 2.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, a cover 10 is shown adapted to be installed over the top of a valve box 12 which comprises an enclosure extending down from the surface of a paved area 14. The shut off valve (not shown) is located at some varying distance below the cover 10.

The cover 10 is secured to the top of the valve box 12. A cover lock mechanism 16 mounted to the underside of the cover 10 so as to be suspended within the valve box 12. The cover 10 is normally prevented from being moved off the top of the valve box by the lock mechanism 16 which is normally in a locked condition.

The cover lock mechanism 16 is attached to the underside of the cover 10 by being connected to four tapered posts 18 integral with the cover 10, which projecting down from the underside of the cover 10. A threaded hole 20 extends up into each post 18 (FIG. 4), each receiving a cap screw 22 which passes up through a respective one of the slotted holes 23 in a respective radially extending aligned locking plates 24A, 24B.

The slotted holes 23 accommodate radial movement of the locking plates 24A, 24B created by up and down movement of a cam piece 34 caused by rotation of a security bolt 44 as described below. The cap screws 22 each first pass through aligned holes 26 in a pair of angle brackets 28A, 28B and through a spacer 27 installed in each of the slotted holes 23.

The presence of the spacers 27 create a slight clearance between the brackets 28A, 28B and the locking plates 24A, 24B to allow limited radial movement of the locking plates 24A, 24B even after the screws 22 are tightened as will be described herein while attaching securely the locking plates 24A, 24B to the posts 18 and thus to the cover 10.

Pairs of metal washers 25 and a felt washer 29 sandwiched between the same also help to freely allow radial movement of the locking plates 24A, 24B by up and down movement of the cam piece.

The locking plates 24A, 24B each have an outer end surfaces 26A, 26B which are preferably curved to match the curvature of the inside surface 13 of the valve box 12.

The outer ends of the angle brackets 28A, 28B are also curved to match the curvature of the end surfaces 26A, 26B of the locking plates 24A, 26B.

A central rectangular opening 30 is formed in each locking plate 24A, 24B as well as an aligned rectangular notch 32, the notch 32 together providing a clearance to accommodate a central portion of the cam piece 34 extending between the inner ends of the locking plates 24A, 24B.

The cam piece 34 has a pair of angled inwardly slightly tapered slots 36A, 36B extending up from the outer lower sides thereof of a width substantially greater than the thickness of the locking plates 24A, 24B.

The cam piece 34 is comprised of a generally rectangular steel block with a central threaded hole 40 extending into the top thereof threadably receiving a security bolt 44. A counterbore 41 formed therein which is provided to collect any lubricant squeezed out from a thick felt washer 50 as further described below.

The security bolt head 42 is formed with a custom drive feature having a shape unique to a utility company with a matching drive socket (not shown) as described above, enabling rotation of the security bolt 44 in either direction. As mentioned above, such security bolts 44 are commercially available and now in use by utilities which tightly control their distribution to their staff minimizing the possibility that such tools would by obtainable by unauthorized persons.

A molded plastic cap 43 protects the bolt head 42 from the effects of exposure to the elements.

The drive bolt shank 45 is threaded through a lock nut 46, and passes through a pair of metal washers 48 and thick felt washer 50 before being threaded into the hole 40 extending down into the top of the cam piece 34.

Figure 5:
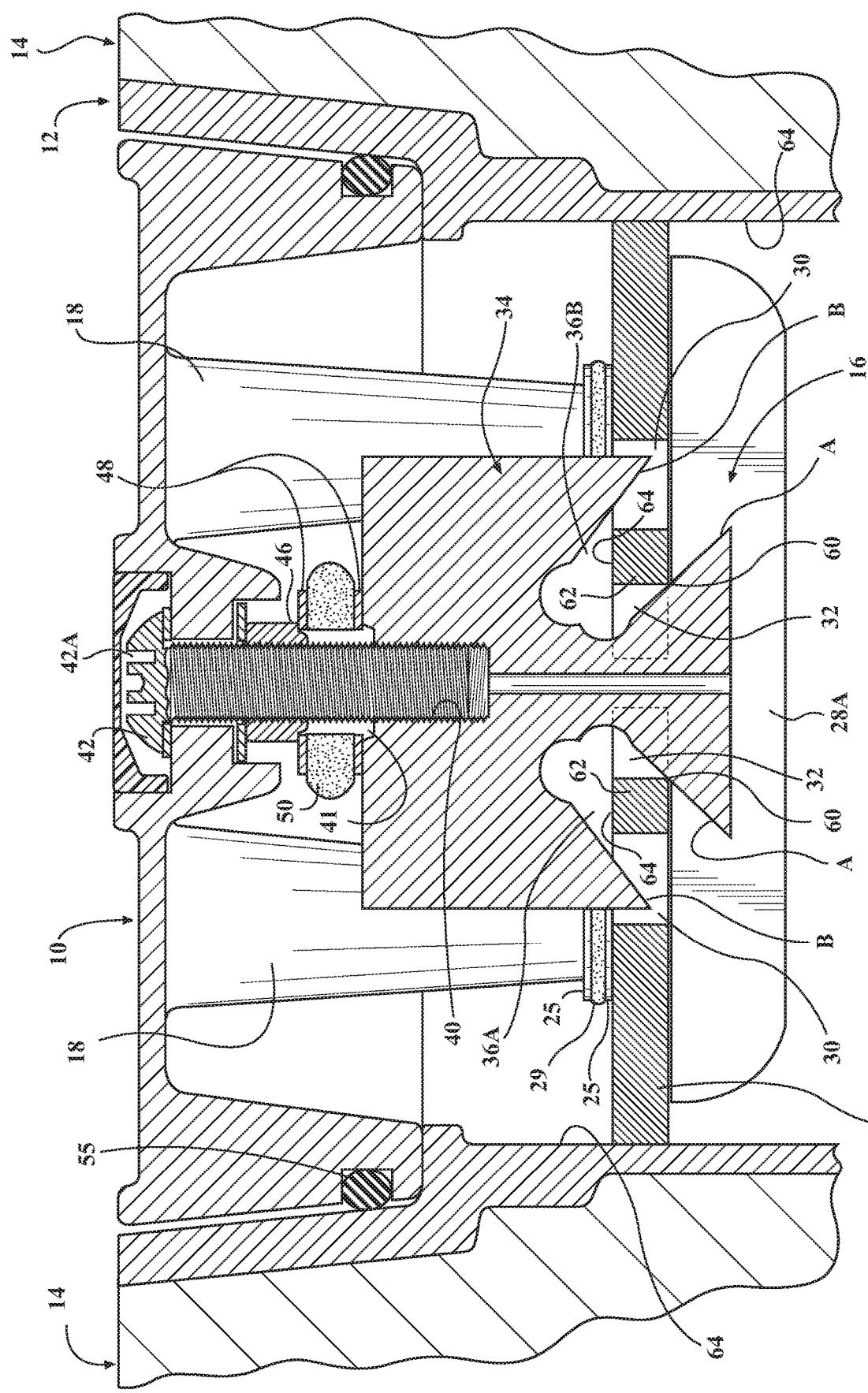
FIG. 5 is a sectional view of a fragmentary portion of a valve box and an installed cover with the locking mechanism as shown in FIGS. 1-4 in a locked condition.

The felt washer 50 is saturated with a special Teflon™ based non irritating grease, commercially available under the trademark "Super Lube". This keeps the threaded shank 45 of the security bolt 44 lubricated to prevent seize up of the security bolt 44 over time. As seen in FIG. 5, the felt washer 50 is squeezed between the lock nut 46 and the top of the cam piece 34 when the cam piece 34 is elevated. Any lubricant squeezed out is collected in the counterbore 41 and causes the threads on the shank 45 to pick up lubricant each time the lock mechanism 16 is operated, maintaining a lubricant film on the threads of the security bolt 44 and the hole 40.

The cover 10 may have a pair of lifting features 52 able to be engaged with a conventional lift pliers (not shown) in a known manner to conveniently enable lifting out of the cover 10 and attached lock mechanism 16 in order to remove the same from the valve box 12.

A perimeter groove 54 in the cover 10 receives an elastomeric perimeter seal 55 which prevents debris from entering the valve box 12 and accumulating therein.

Figure 4:
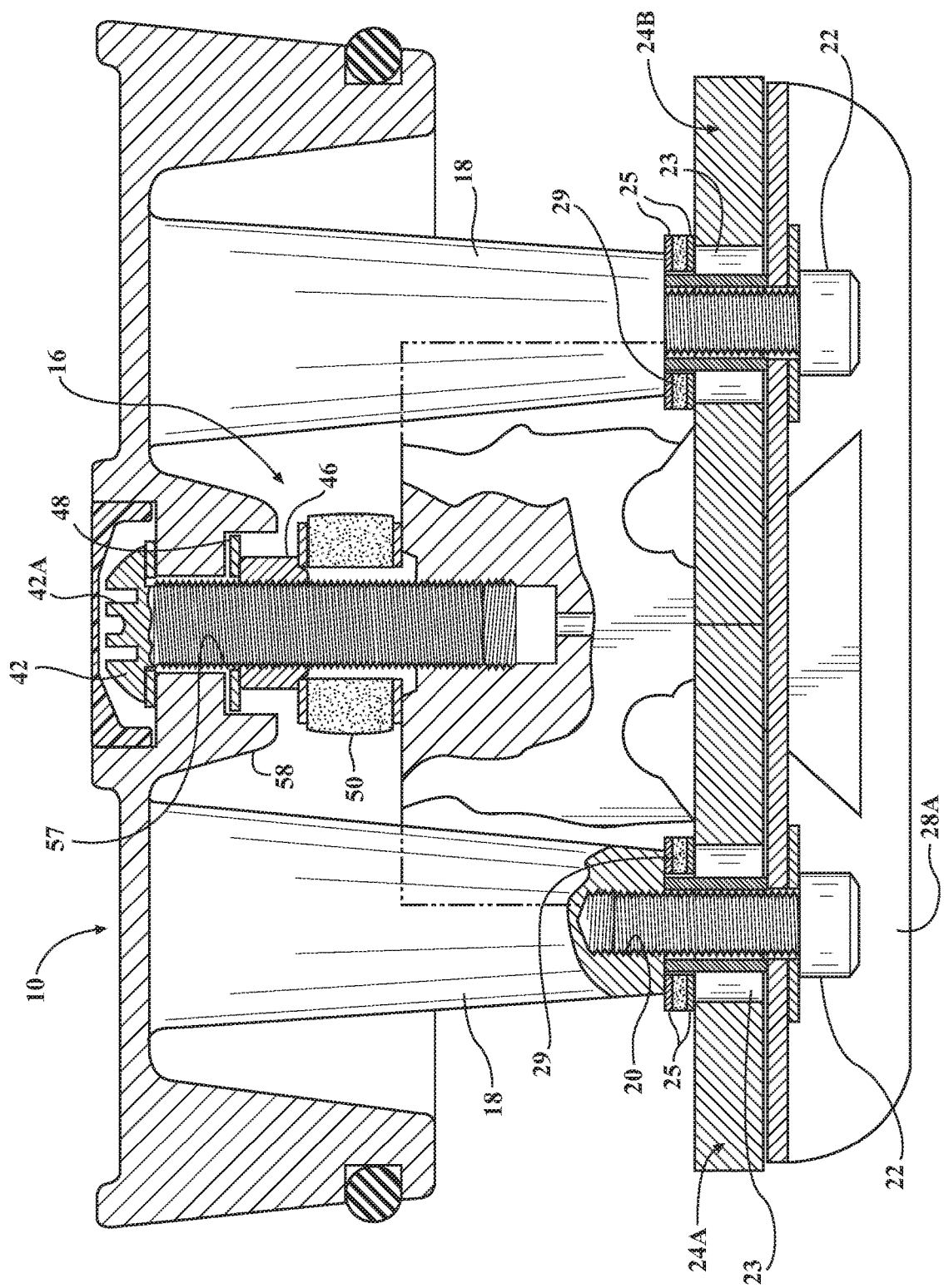
FIG. 4 is a view of a section taken vertically through the valve box cover and attached lock mechanism shown in FIGS. 1 through 3.
Figure 6:
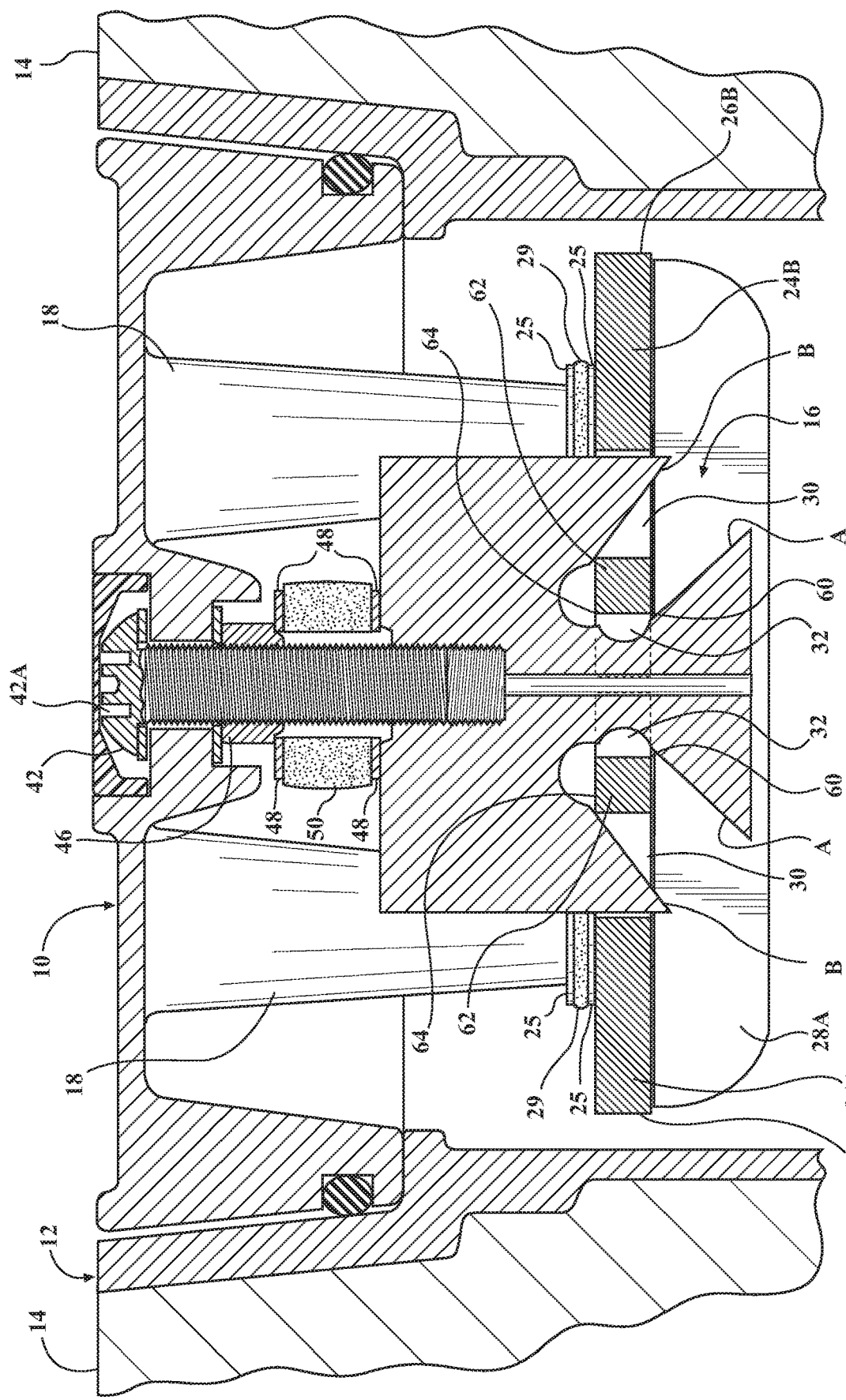
FIG. 6 is a sectional view of the components shown in FIG. 5 with the lock mechanism in a released condition.
Figure 7:
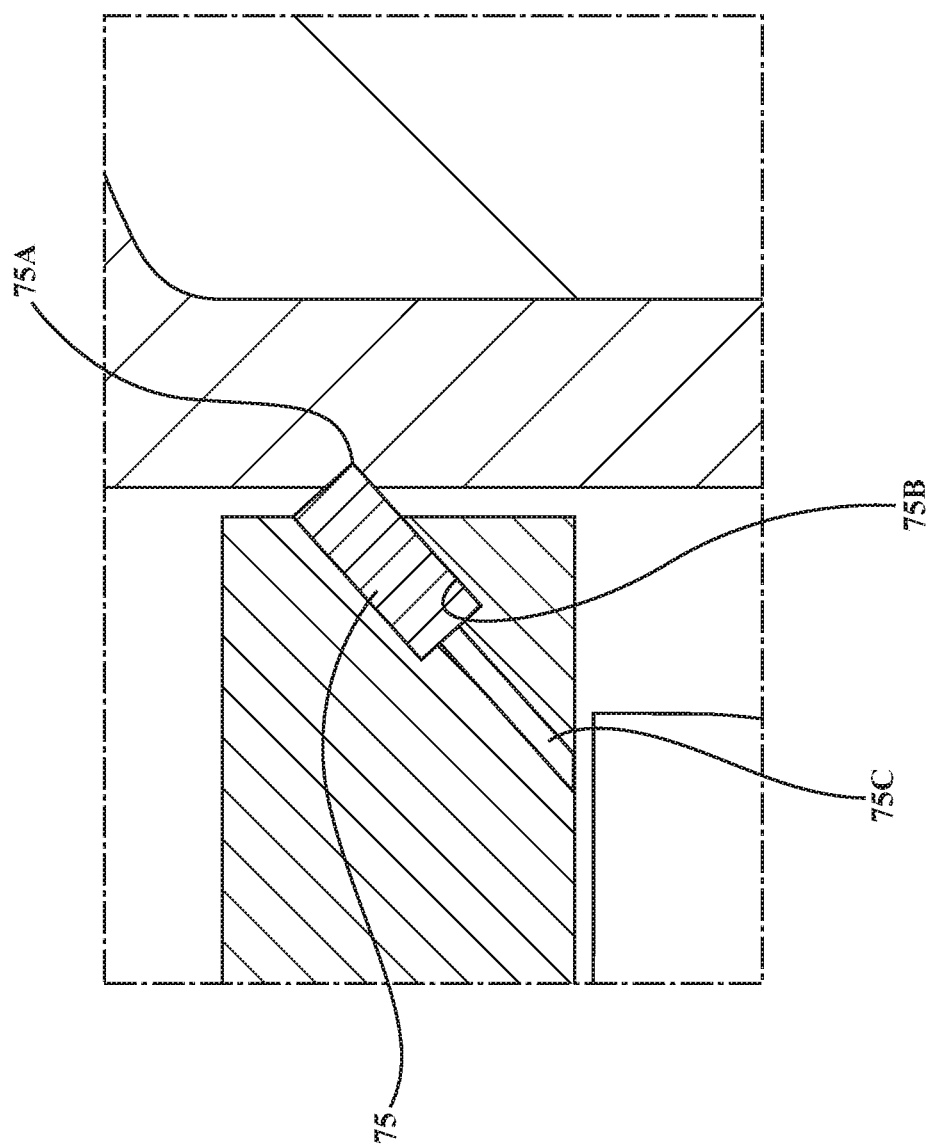
FIG. 7 is an enlarged fragmentary view of one corner of cobalt-tungsten carbide pin of one of the locking plates showing an insert pin angled up and forced against a sidewall of the valve box.
Figure 8:
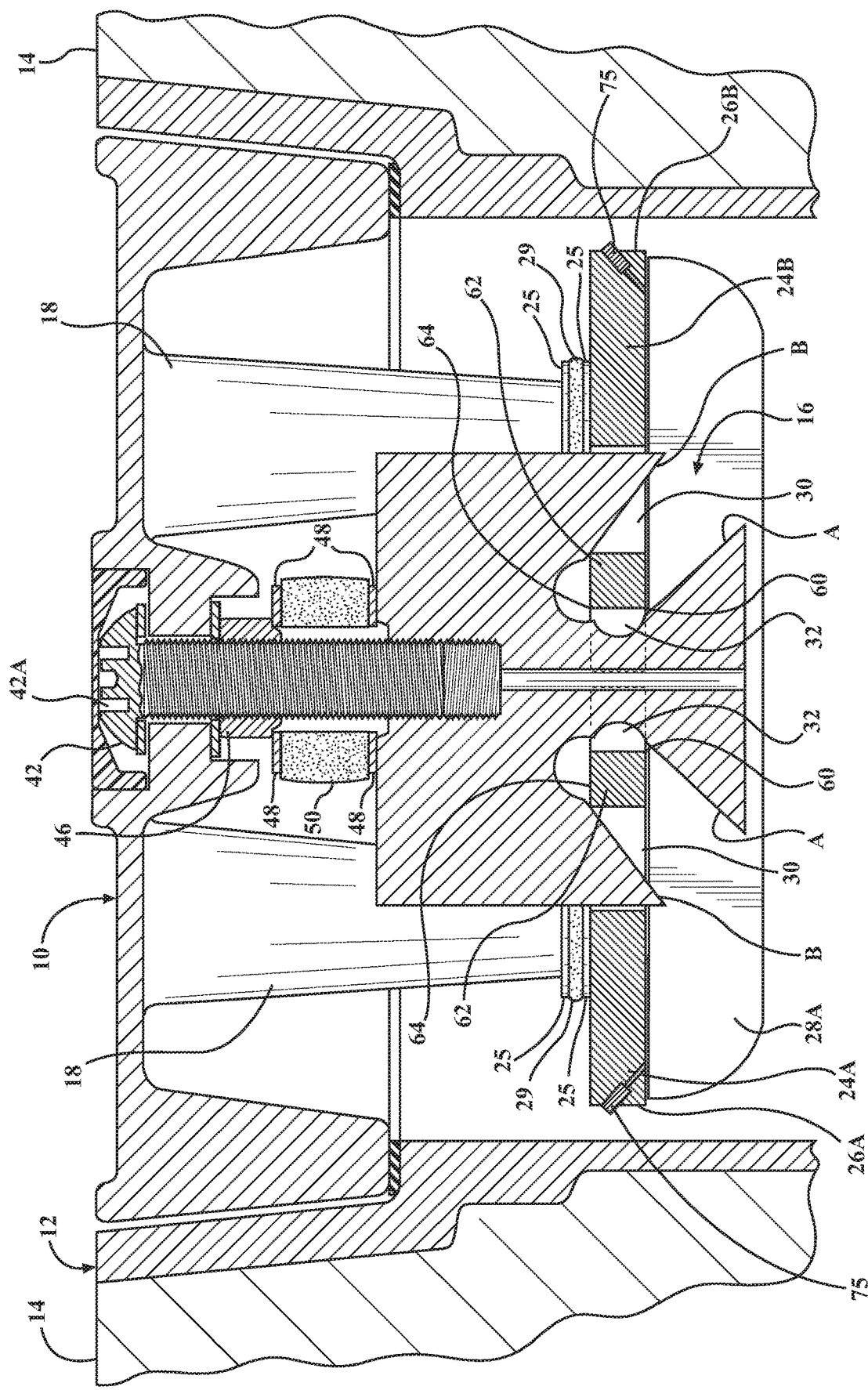
FIG. 8 is a sectional view of the locking cover showing the addition of a locking pin.
Figure 9:
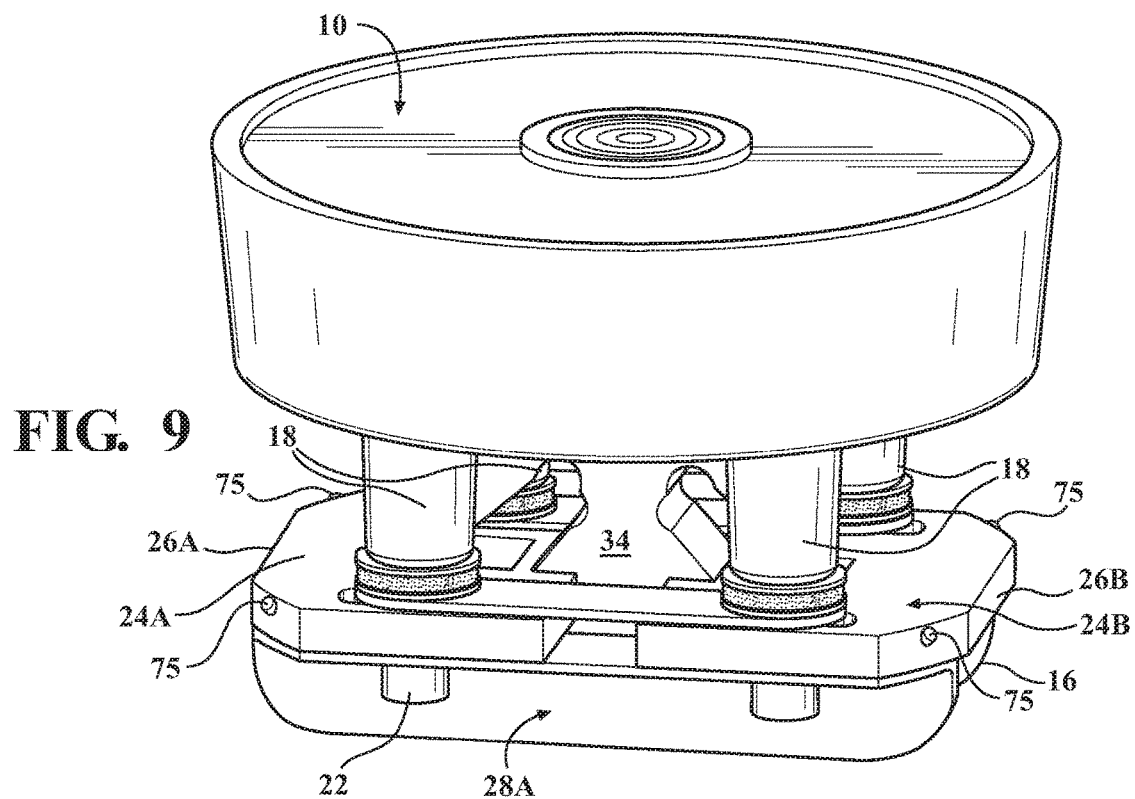
FIG. 9 is a perspective view from the top of an another version of a valve box cover according to the invention.
Figure 10:
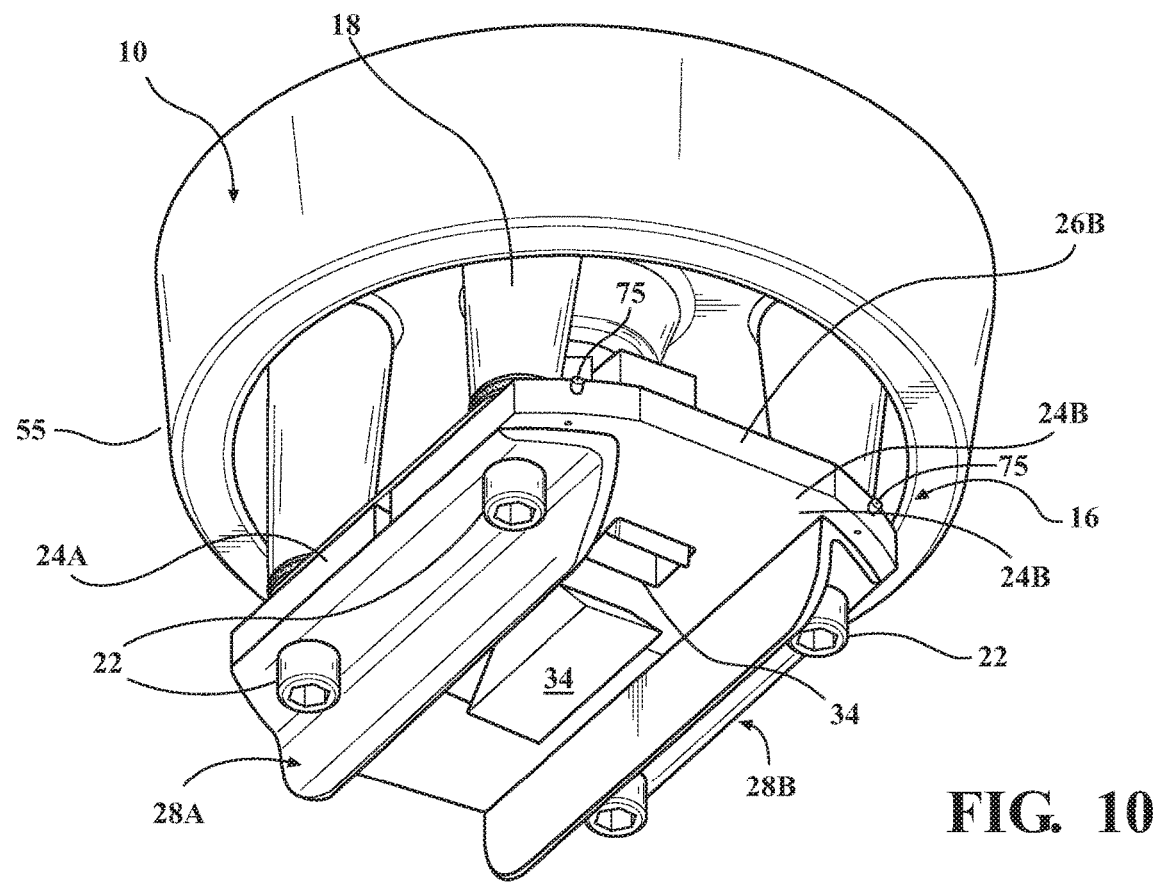
FIG. 10 is a perspective view from the bottom of the valve box cover shown in FIG. 9.
Figure 11:
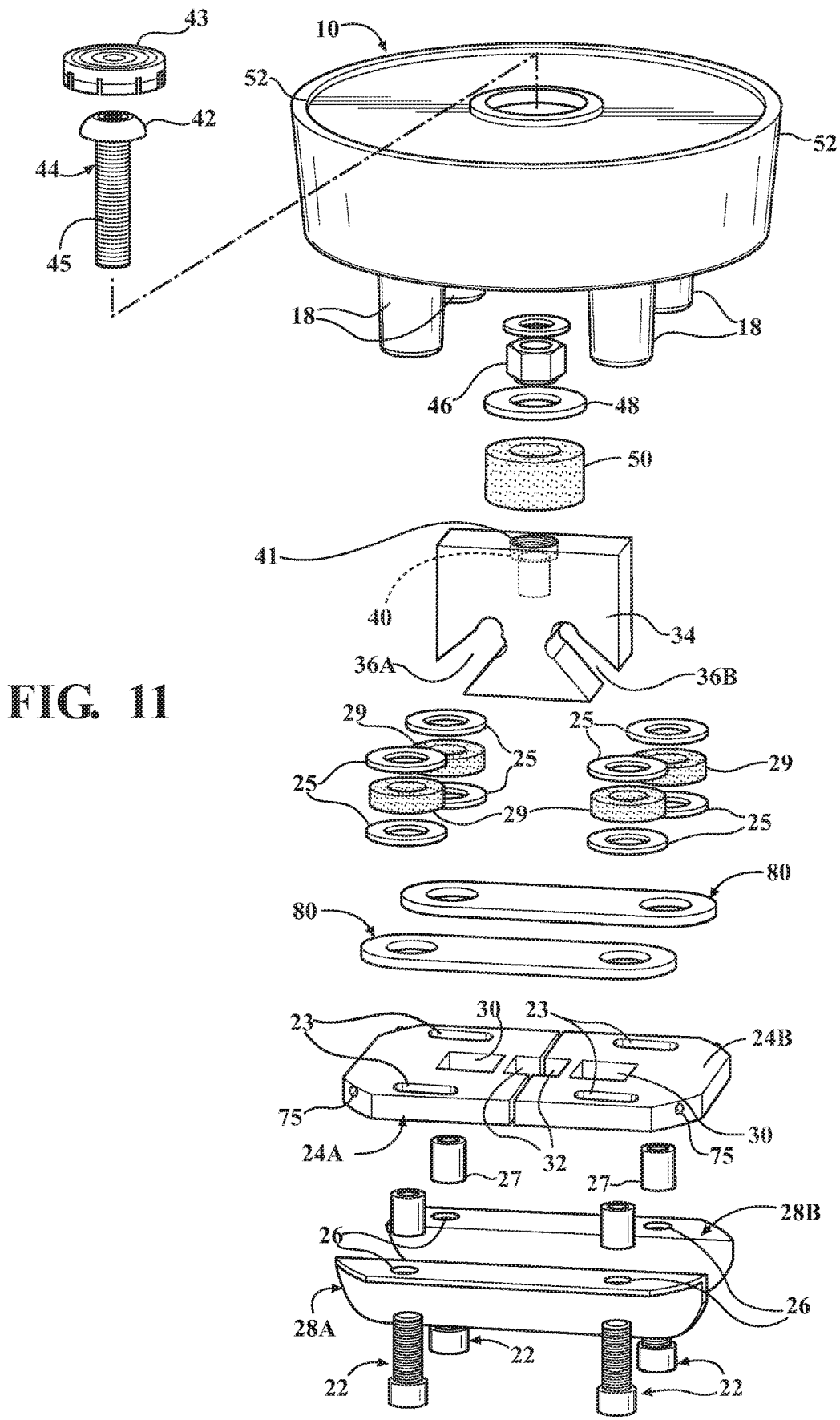
FIG. 11 is an exploded perspective view of a valve box cover and lock mechanism components shown in FIGS. 9 and 10.
Figure 12:
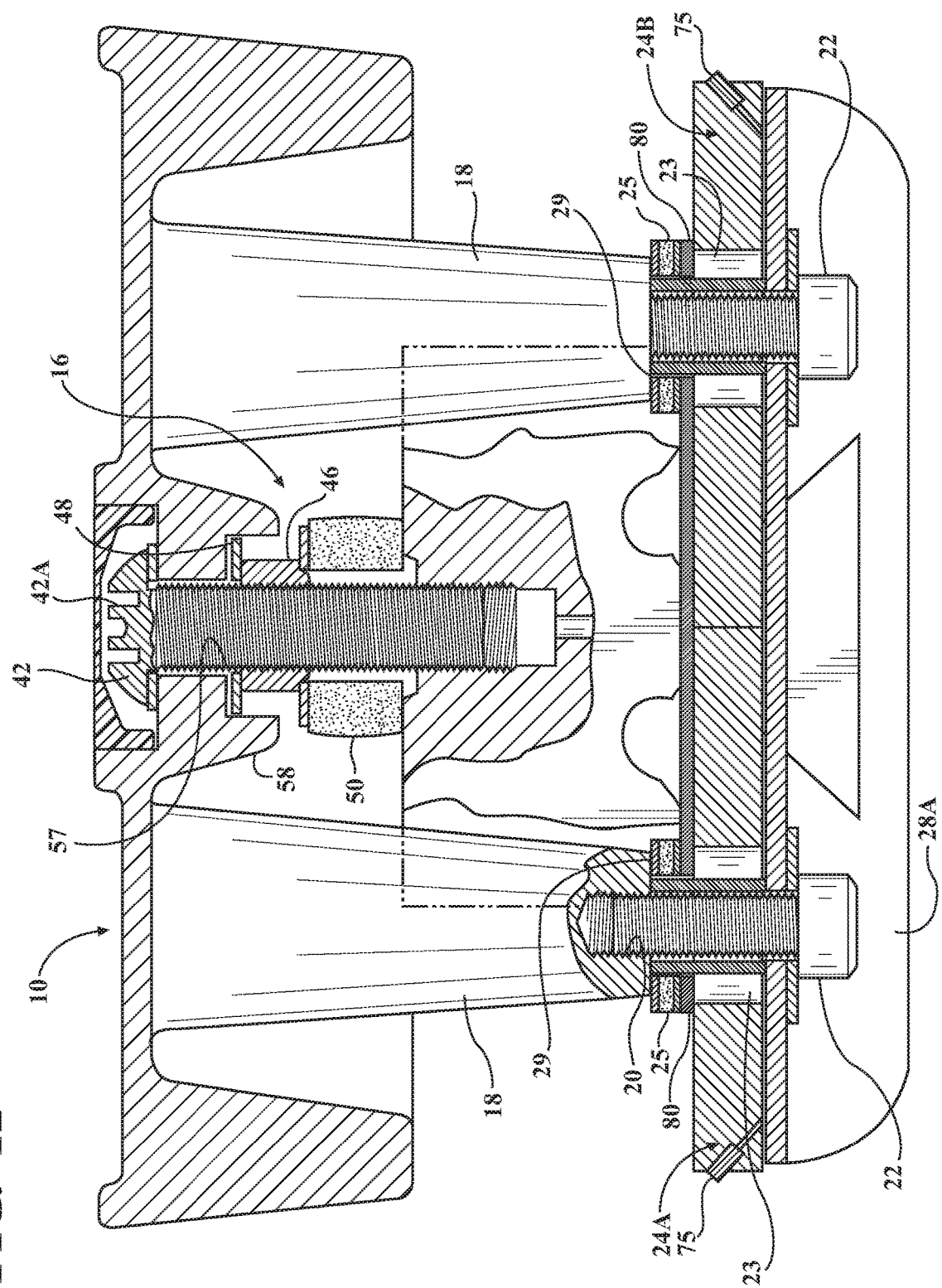
FIG. 12 is a partial sectional view of the valve box cover shown in FIGS. 9 and 10 with the locking plates in the retracted position.
Figure 13:
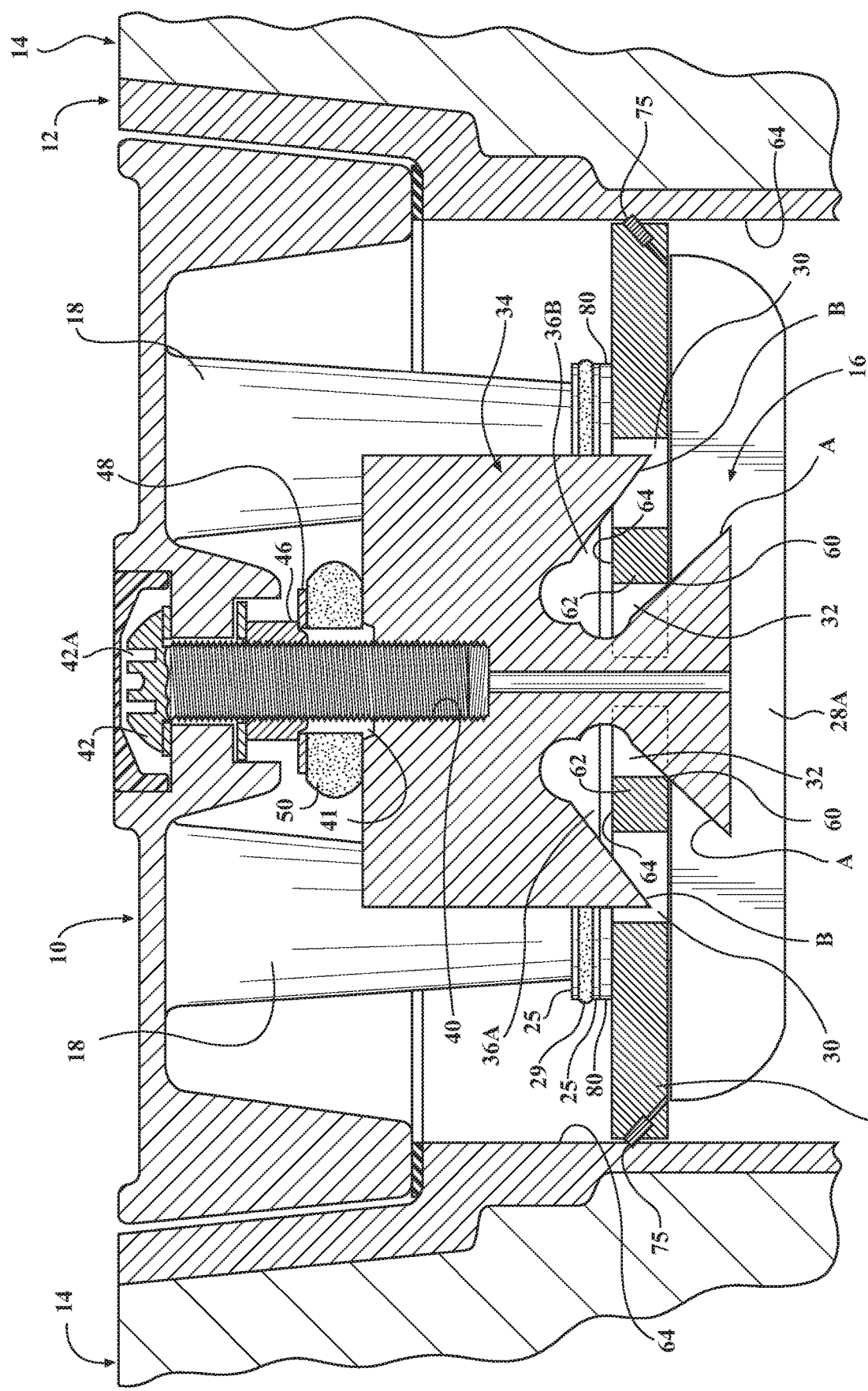
FIG. 13 is a view of a partial section through the valve box cover shown in FIGS. 9 and 10 together with surrounding portions of the valve box and pavement with the locking plates as shown in FIGS. 9 and 10 in the locked condition.
Figure 14:
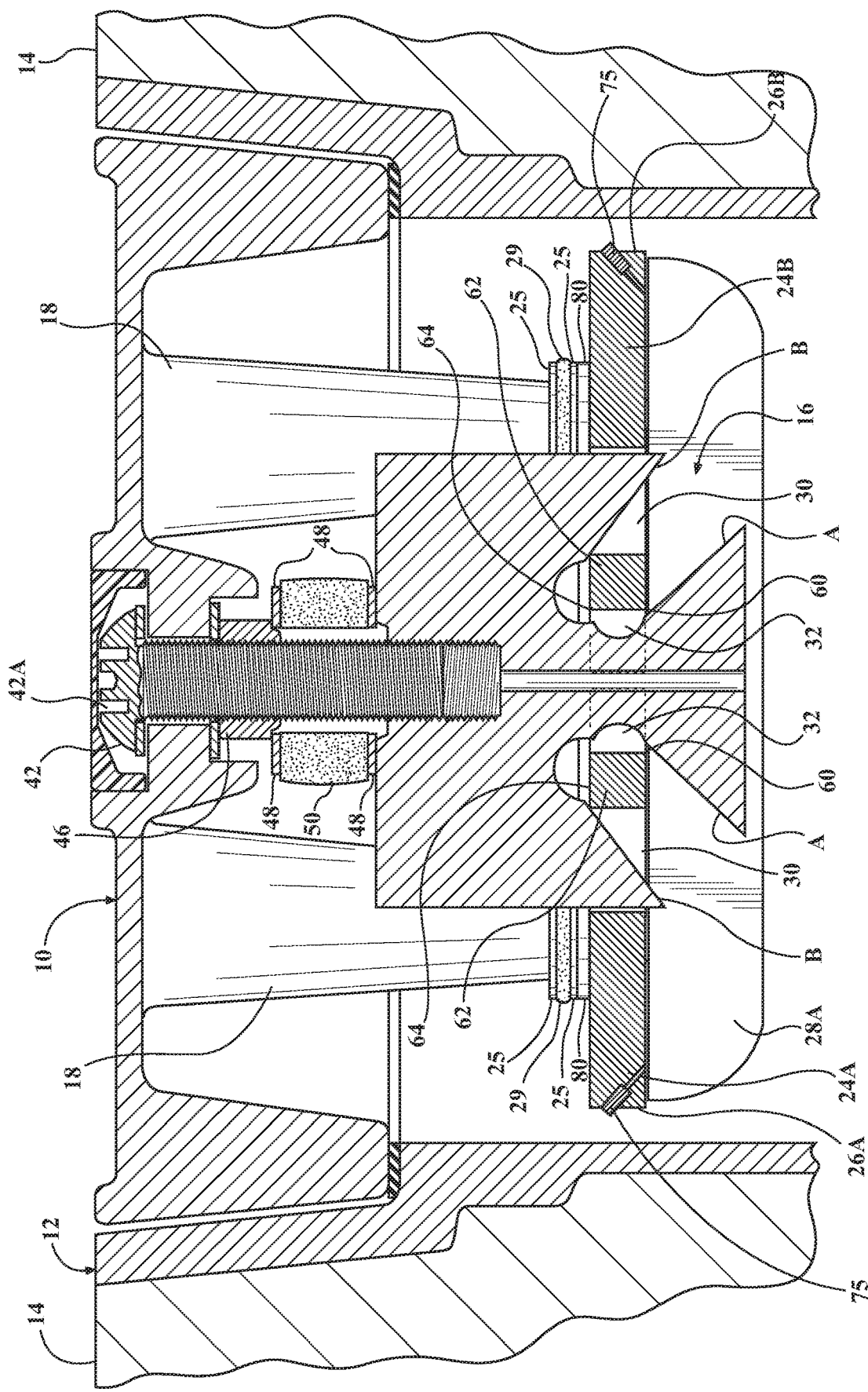
FIG. 14 is a partially sectional view as shown in FIG. 13 but with the locking plates retracted.

Referring to FIGS. 4 through 6, the security bolt 44 passes through a clearance bore 57 in a cast in protuberance 58 and is threaded through the lock nut 46 and washer 48 which are drawn up to abut the underside protuberance 58 of the cover 10 when the security bolt 44 is in a release position with the lock mechanism 16 not engaged (FIG. 6).

When the security bolt 44 is rotated in a first direction, the lower sides A of the cam piece slots 36A, 36B engage the radially inmost and axially lower corners 60 of the rectangular portion 62 of the locking plates 24A, 24B defined between the opening 30 and notch 32 of the locking plates 24A, 24B.

The cam piece 34 is moved up by continued rotation of the security bolt 44, engaged with the inner lower corners 60 of the lower side A of the slots cams the locking plates 24A, 24B radially outward, causing the curved outer end surfaces 26A, 26B thereof into firm engagement with the inner surface 64 of the valve box 10 to securely engage the same.

When the security bolt 44 is rotated in the opposite direction, the cam piece 34 is moved down bringing the upper sides B of the slots 36A, 36B into engagement with the upper and outer corners 64 of the cam piece 34 and camming the locking plates 24A, 24B back towards each other. The lock nut 46 restrains the security bolt 40 from moving up at this time to insure that the cam piece 34 is moved down by the rotation of the security bolt 40.

The relatively great area of the engaged components generates a substantial resistance to any prying efforts exerted on the cover 10.

Referring to FIGS. 7-17, an insert pin 75 made of a cobalt-tungsten carbide is received in an angled up hole 75B machined into the rounded corners of each locking plate 24A, 24B (FIG. 6) to create an outer edge 75A of each pin 75 engagable with the valve box inner surface 64. A vent hole 75C is associated with each hole 75B to allow the pins 75 to be readily received in the hole 75B. The edge 75A is able to penetrate any coating applied to reduce corrosion so that the coating does not prevent a frictional engagement with the valve box inner surface 64.

Also shown in FIGS. 11-17 are a pair of elongated flat plates 80, each extending between pairs of the bolts 22 which each extend through a hole in each end of both flat plates 80 which in turn are aligned with slots 23 on each side of the locking plates 24A, 24B. The plates 80 rest directly on the top of outer sides of a respective locking plate 24A, 24B to form a connection between the locking plates 24A, 24B. This prevents lifting up inner ends of the locking plates 24A, 24B when the cam piece 34 engages a corner 60 of each of the locking plates 24A, 24B to tend to lift the inner adjacent ends thereof which is prevented by the plates 80.

This arrangement has been found to prevent lifting up of the inner ends of the locking plates 24A, 24B when the cam piece 34 is being raised.

The plates 80 thus keep the motion of the locking plates 24A, 24B horizontal.

Figure 17:
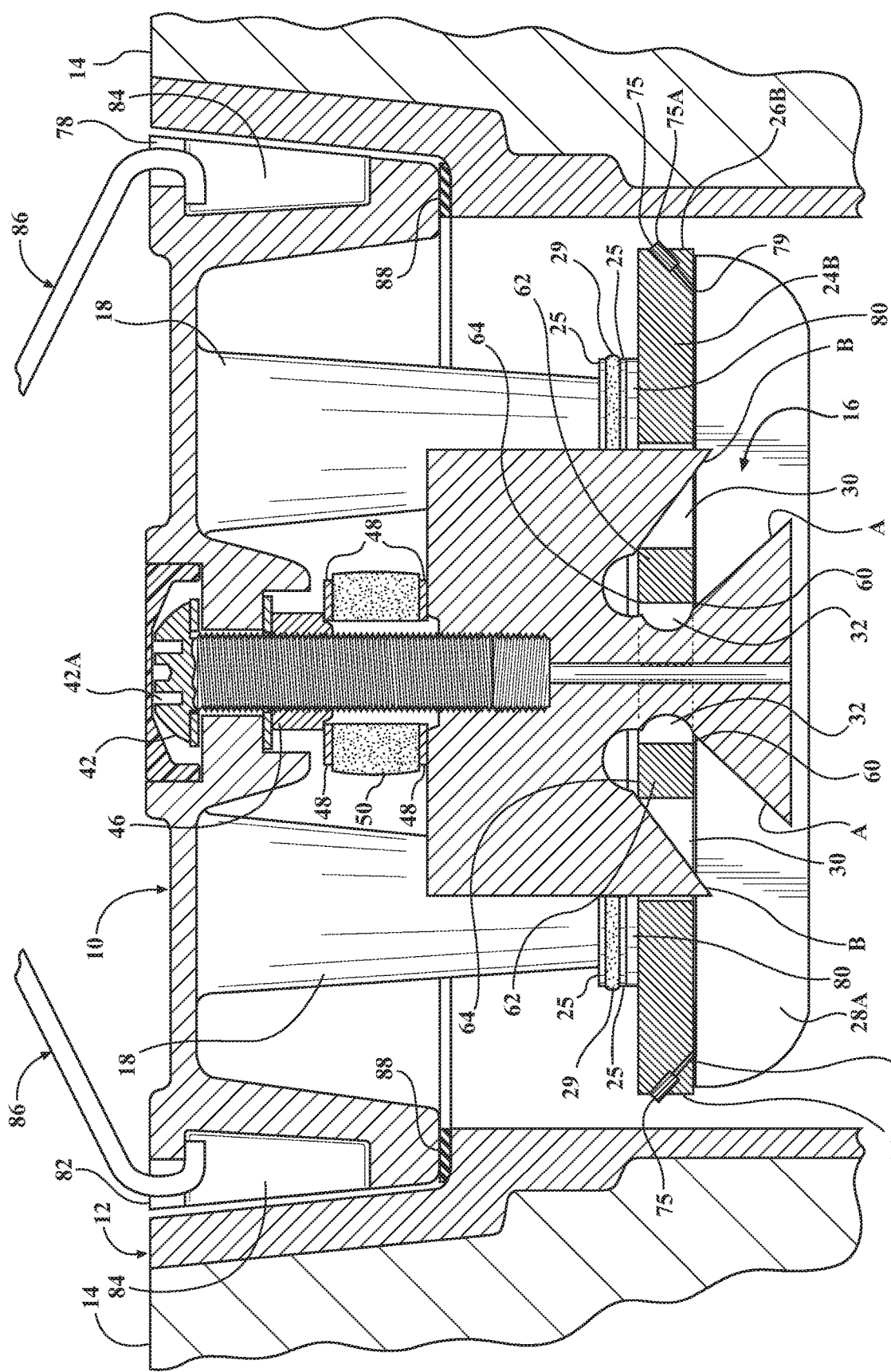
FIG. 17 is a partially sectional view of the valve box cover shown in FIGS. 15 and 16 with a fragmentary portion of a lift tool engaging the lock box cover tool engagement features.

FIGS. 15-17 show a pair of slots 84 and recesses 86 cut into a perimeter of the cover 10 on opposite sides thereof. This establishes a positive hooking of a lift tool (with the cover 86 thereof shown).

A gasket 88 may also be installed to minimize the entry of water into the lock mechanism 16.

The invention claimed is:

1. A lockable cover assembly including a cover for covering an open topped valve box so as to prevent access to a utility shut off valve located within said valve box and below said cover, said shut off valve accessible through an open top of said valve box only after said cover is removed therefrom;
  a locking mechanism mounted to an underside of said cover acting to prevent moving said cover off said open top of said valve box when said locking mechanism is in a locking condition, and allowing said cover to be moved off said open top of said valve box when said locking mechanism is in an unlocked condition;
  said locking mechanism including a pair of horizontally extending locking plates aligned with each other, disposed within said valve box and below said cover, and extending radially away from each other and toward respective opposite sides of an inner surface of said valve box, said locking plates mounted by a locking plate support arrangement so as to allow a limited radial back and forth movement of each of said locking plates to be able to engage or disengage an outer end of each of said locking plates with said respective sides of said inner surface of said valve box to prevent removal of said cover when said locking plate outer ends are engaged with said valve box inner surface and to allow removal of said cover when said locking plates are disengaged from said valve box inner surface;
  said locking mechanism further including a cam mechanism operated by a security bolt having a head located atop said cover and further having a threaded shank extending down through an opening in said cover and extending further down to be threaded into a threaded bore in a cam piece forming a part of said cam mechanism, said cam piece configured to be engageable simultaneously with both of said locking plates so as to move both of said locking plates radially out to bring the outer ends thereof into engagement with said inner surface of said valve box upon continued rotation of said security bolt in a first direction to raise said cam piece; both of said locking plates able to be moved radially inward so as to be disengaged from said inner surface of said valve box upon rotation of said security bolt in an opposite second direction to lower said cam piece, thereby selectively allowing locking or unlocking of said cover to prevent or to allow removal of said cover from said open top of said valve box by rotation of said security bolt in said first or second direction respectively; and
  each of said locking plates outer ends have at least one upwardly angled pin received into a respective hole in each of said locking plate outer ends, the angling of each pin presenting an outer edge that engages with said inner surface of said valve box when said locking plates are moved a sufficient distance outward by upward movement of said cam piece.

2. A lockable cover assembly including a cover for covering an open topped valve box so as to prevent access to a utility shut off valve located within said valve box and below said cover, said shut off valve accessible through an open top of said valve box only after said cover is removed therefrom;
  a locking mechanism mounted to an underside of said cover acting to prevent moving said cover off said open top of said valve box when said locking mechanism is in a locking condition, and allowing said cover to be moved off said open top of said valve box when said locking mechanism is in an unlocked condition;
  said locking mechanism including a pair of horizontally extending locking plates aligned with each other, disposed within said valve box and below said cover, and extending radially away from each other and toward respective opposite sides of an inner surface of said valve box, said locking plates mounted by a locking plate support arrangement so as to allow a limited radial back and forth movement of each of said locking plates to be able to engage or disengage an outer end of each of said locking plates with said respective sides of said inner surface of said valve box to prevent removal of said cover when said locking plate outer ends are engaged with said valve box inner surface and to allow removal of said cover when said locking plates are disengaged from said valve box inner surface;
  said locking mechanism further including a cam mechanism operated by a security bolt having a head located atop said cover and further having a threaded shank extending down through an opening in said cover and extending further down to be threaded into a threaded bore in a cam piece forming a part of said cam mechanism, said cam piece configured to be engageable simultaneously with both of said locking plates so as to move both of said locking plates radially out to bring the outer ends thereof into engagement with said inner surface of said valve box upon continued rotation of said security bolt in a first direction to raise said cam piece; both of said locking plates able to be moved radially inward so as to be disengaged from said inner surface of said valve box upon rotation of said security bolt in an opposite second direction to lower said cam piece, thereby selectively allowing locking or unlocking of said cover to prevent or to allow removal of said cover from said open top of said valve box by rotation of said security bolt in said first or second direction respectively; and a pair of elongated flat plates, each flat plate mounted atop a respective side of both of said locking plates so as to allow said back and forth movement of said locking plates while preventing lifting up of both of said locking plates when said cam piece is moved upwardly by rotation of said security bolt.

* * * * *